United States Patent [19]
Beaudoin et al.

[11] 3,951,224
[45] Apr. 20, 1976

[54] VARIABLE DIAMETER PULLEY (VENTILATING)

[76] Inventors: Guy Beaudoin, 1238 Chabenel St., Drummondville South, Quebec; Marcel Vincent, 320 Hebert St., Wickham, Quebec, both of Canada

[22] Filed: Jan. 14, 1975

[21] Appl. No.: 541,071

[52] U.S. Cl. .................. 180/54 A; 74/230.17 E; 180/5 R
[51] Int. Cl.² .................................... B60K 11/06
[58] Field of Search .............. 180/54 A, 5 R; 74/230.17 E

[56] References Cited
UNITED STATES PATENTS

| | | | |
|---|---|---|---|
| 2,215,831 | 9/1940 | Heyer | 74/230.17 E |
| 3,648,532 | 3/1972 | Vallieres | 74/230.17 E |
| 3,768,323 | 10/1973 | Houle | 74/230.17 E |
| 3,773,127 | 11/1973 | Aaen et al. | 180/54 A X |
| 3,810,518 | 5/1974 | Smale | 180/5 R X |

*Primary Examiner*—M. H. Wood, Jr.
*Assistant Examiner*—Milton L. Smith

[57] ABSTRACT

A variable diameter pulley including a pair of pulley flanges axially displaceable one relative to the other, centrifugally responsive weights acting on one flange to cause axial displacement thereof, a pusher ring interposed between the actuating weights and the axially displaceable flange, a drive device transmitting the rotation to the weights and the axially displaceable pulley flange. This variable diameter pulley is characterized by forming an annular space having inlet and outlet apertures appropriately positioned with respect to the weights, such that the latter act as vanes in the annular space to produce ventilation outwardly through the outlet apertures.

3 Claims, 4 Drawing Figures

VARIABLE DIAMETER PULLEY (VENTILATING)

This invention relates to a pulley of the type having a pair of pulley flanges adapted to be axially moved toward and away one from the other to vary the effective engagement of a belt therewith. A pulley of this type finds particular application in a snowmobile.

The previously proposed pulleys of the above type reveal that other desiderata concerning the operation of such pulleys have not been met and that further functional and structural advantages may be imparted to such pulleys. In particular, a hood now encloses the motor and driven parts and has become standard on a snowmobile to reduce the noise. Besides, heat sensitive components are more commonly used among the driven parts. For these reasons, there is now an increased need for ventilation of the pulley and of the inside of the hood.

It is a general object of the present invention to provide a variable diameter pulley of the above type which is adapted to produce ventilation of itself and/or of associated parts and spaces.

It is a more specific object of the present invention to provide a variable diameter pulley of the above type, which takes advantage of the centrifugally responsive weights thereof to make the latter operate as ventilation vanes and thereby produce ventilation without addition of separate vanes and with substantially no increase in the complexity of the pulley.

The above and other objects and advantages of the present invention will be better understood by the following description of a preferred embodiment thereof which is illustrated, by way of example, in the accompanying drawings, wherein.

Figure 1:
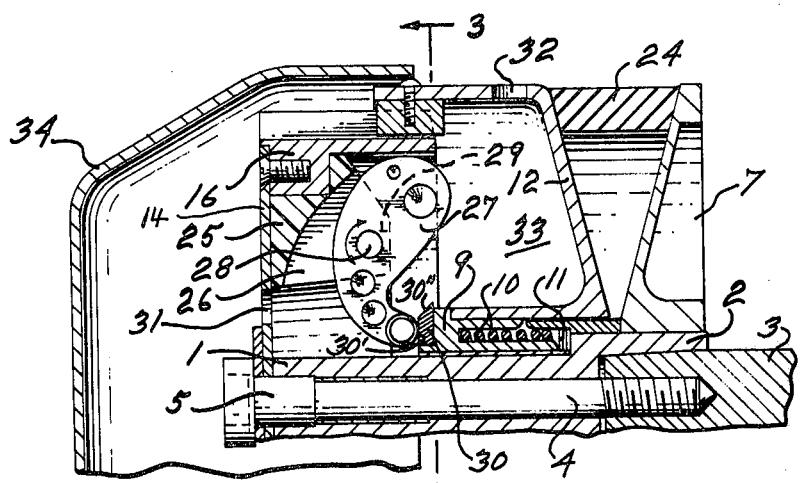
FIG. 1 is an axial cross-sectional view through a variable diameter pulley shown in fully actuated position according to the present invention.

The illustrated variable diameter pulley includes a shaft 1 having an axially bored end 2 engaging on the end of a driving shaft 3. The pulley shaft 2 is fixed to the driving shaft 3 by a bolt 4 extending through a bushing 5. The axially bored end 2 is of larger diameter than the remainder of the pulley shaft and forms an annular shoulder 6 constituting an axial abutment or stop, the function of which will be better defined later.

A pulley flange 7 is rigidly fixed on the bored end 2 for rotation with the pulley shaft 1 and in axially fixed position relative to the latter. A sleeve 8 is also rigidly fixed on the bored end 2 and projects axially away from the pulley flange 7. Another sleeve 9 is rotatably and slidably mounted on the pulley shaft 1. The sleeves 8 and 9 cooperatively form an annular space with each other in which is contained a compression spring 10. Shims 11 are positioned against the annular shoulder or stop 6 with the spring 10 in abutment therewith. As seen in FIG. 1, the shims 11 in cooperation with the axial stop 6 limit the axial displacement of the sleeve 9 relative to the fixed pulley flange 7, such as to maintain a clearance between the axially displaceable pulley flange 12 and the fixed flange 7. The pulley flange 12 is fixed to the sleeve 9 for bodily axial and rotational displacement therewith. The axially displaceable flange 12 is formed with a cylindrical skirt portion 13 at the periphery thereof.

A circular drive plate 14 is clamped against the end of the pulley shaft 1 by the bolt 4 and the washer 15. A sleeve 16 is secured peripherally to the drive plate 14 by screws 17, or other suitable expedient, and projects toward the pulley flanges 7 and 12. Thus, the cylindrical skirt portion 13 circumscribes the sleeve 16 in radially spaced-apart relationship. The sleeve 16 is formed with ridges 18 and 19 on the external cylindrical surface thereof. These ridges 18 and 19 project longitudinally of the axis of the pulley. In particular, the ridges 18 extend parallel to the axis of the pulley and thus form similarly projecting grooves or guideways 20. The ridges 19, instead, extend at an angle to the axis of the pulley and form similarly projecting grooves or guideways 21. Thus, the grooves 21 extend at an angle or diagonally relative to the grooves 20 and alternate with the latter. A follower block or pad 22 is selectively engaged in each groove 20 or 21. It must be noted that the blocks 22 are pivotally mounted on the inner face of the cylindrical skirt 13, by rivets 23, to thereby allow selective engagement in the grooves 20 or 21.

The drive plate 14 and sleeve 16 thus drive the pulley flange 12 at the periphery thereof and the required clearances of the blocks 22 in the grooves produce less vibration and noise than the conventional splined drive, since the same clearances are farther from the rotation axis and thence reduce the possible angular play. Preferably, the blocks or pads 22 are made of nylon, plastic, rubber or the like, which further enhances the reduction of noise.

When the blocks 22 are selectively engaged in the diagonal grooves 21, the angle of the latter being appropriately chosen relative to the direction of rotation, upon starting the rotation, the diagonal grooves 21 induce a recessive axial action on the blocks 22 and, consequently, on the axially displaceable flange 12. Consequently, there results a delayed and, thereafter, more energetic drive of the belt 24.

A carrier 25, made of a block of plastic or the like, is mounted on the circular plate 14 inside the sleeve 16. This carrier 25 is in frictionally rotative engagement with the face of the circular plate 14, such as to be driven by the latter, but after some angular shifting of the carrier relative to the circular plate. The carrier 25 is formed with four radial slots 26, each having a centrifugally responsive weight or lever 27 pivoted therein by a pin 28 engaged in a corresponding open notch 29. The weights 27 may thus be readily inserted in the notches 29 which are axially projecting relative to the axis of the pulley.

A pusher ring 30, of wear-resistant material, is removably engaged on the sleeve 9 for rotation therewith. The pusher ring 30 has opposite sides or faces made with dissimilar radial contours; in this case, a completely straight line contour on one face and a broken line contour on the other face defining inner face 30' and outer bevelled face 30" respectively. The pusher ring 30 is engaged by the weights 27, the pivotal movement of which produces the axial displacement of the ring and the displaceable flange 12.

As aforementioned, the carrier 25 is angularly shifted due to inertia relative to the drive plate 14 and, consequently, also relative to the pusher ring 30. Thus, the points of contact of the weights 27 with the ring 30 are similarly angularly varied, resulting in more even wear of the pusher ring 30 and longer life of the latter.

Figure 2:
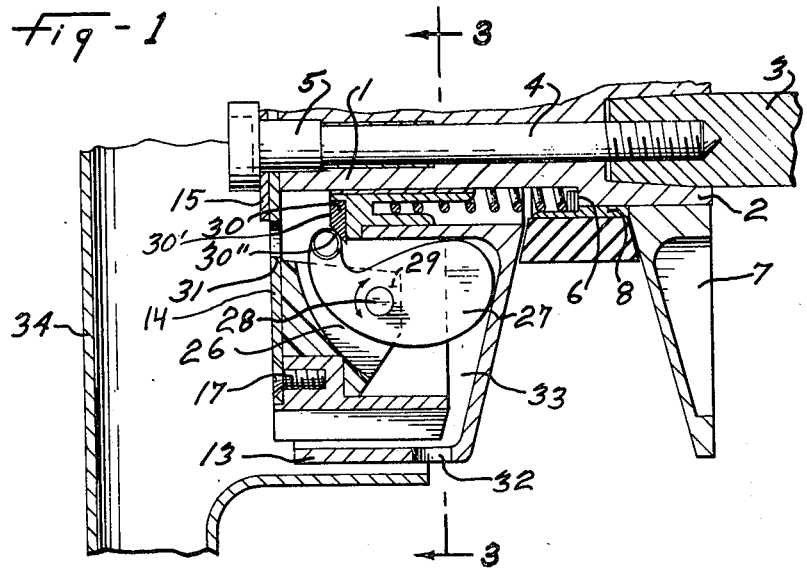
FIG. 2 is a view as in FIG. 1 but with the pulley fully deactuated or in the idle position.
Figure 3:
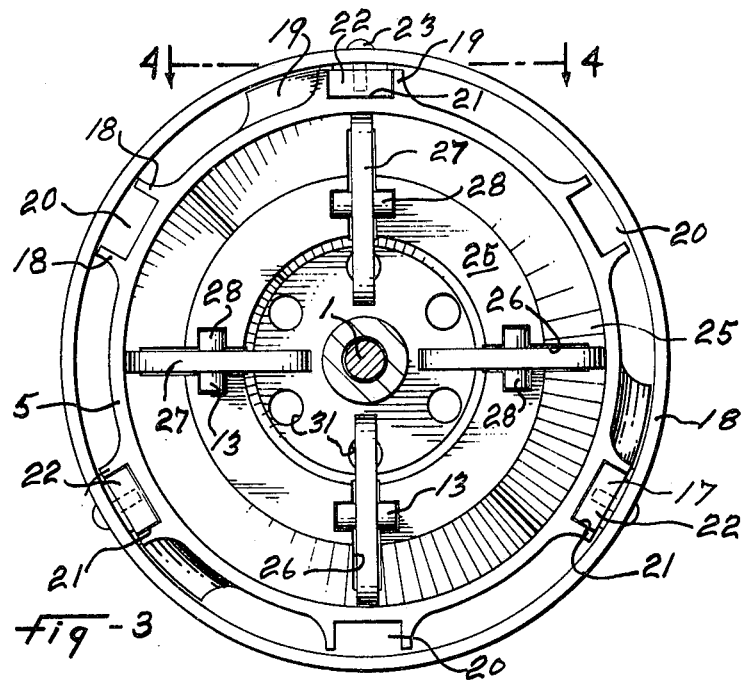
FIG. 3 is a cross-sectional view as seen along line 3—3 in FIG. 1.
Figure 4:
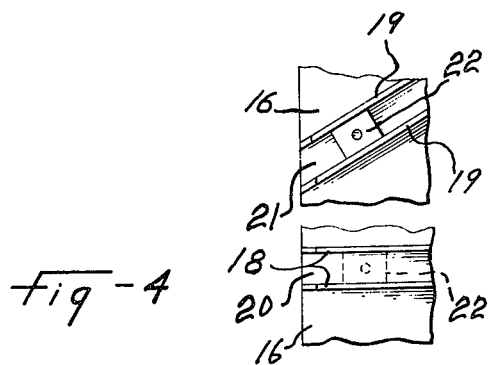
FIG. 4 is a developed plan view of portions of the drive device for the displaceable pulley flange.

The pusher ring 30 may be reversed to selectively present one of the two radially contoured faces to the weights 27. For normal operation, the completely flat face is presented. When the opposite face is presented, as shown in the drawings, the inner end of weights 27 engages bevelled face 30'' in the rest position of the pulley, as shown in FIG. 2. With increase in pulley speed, the inner end of weights 27 has to move up the bevelled face 30'' to engage the perpendicular face portion 30'; thus, clutching takes place at a higher speed than normally. In the fully closed position of the pulley flanges, as shown in FIG. 1, the weight inner end still engages perpendicular face portion 30'. The angle of bevelled face portion 30'' may vary between about ½° and 90° with respect to face portion 30'. The greater the angle, the higher will be the speed at which clutching takes place. The rate of axial response of the displaceable pulley flange 12 may thus be preset according to the need.

The circular plate 14 is provided with air inlet ports or apertures 31, while the skirt 13 of the displaceable flange is provided with air outlet ports or apertures 32 arranged radially outwardly of the inlet ports 31. The drive device formed of the drive plate 14, the sleeve 16 and the carrier 25 forms an annular space 33 with the displaceable flange 12. This arrangement causes the flat weights 27 to act as vanes producing radially outward ventilation by air intake through the inlet ports 31, air flow in the annular space 33, and air exit through the outlet ports 32. This air flow cools the pulley itself and, in a snowmobile, is taken from outside the engine hood by a duct 34 and is circulated inside this hood to cool the engine and other driven parts. This is important, since it permits to close the hood to reduce noise while allowing proper cooling of the engine.

The shims 11 may be removed in relation to the wear of the belt 24, such that the pulley retains the same performance characteristics during the life of the belt.

We claim:

1. In a snowmobile including a chassis, an internal combustion engine having a drive shaft, a hood defining with said chassis a closed space in which said engine is located, and a variable diameter pulley to ventilate said closed space and comprising shaft means connected to said drive shaft and driven by the latter, a first and a second pulley flanges coaxially mounted on said shaft means, said first pulley flange being axially displaceable along said shaft means, a drive device secured to said shaft means for rotation therewith and forming an annular space in cooperation with said first pulley flange and on the opposite side of the latter relative to said second pulley flange, air intake port means and air outlet port means providing external communication with said annular space radially inward and outward respectively, relative to each other and with said air intake means communicating with the exterior of said closed space and said air outlet port means opening within said closed space, and centrifugally responsive members movably supported by said drive device in operative engagement with said first pulley flange for axial displacement of the latter in response to centrifugal action on said centrifugally responsive members, and the latter forming vanes radially projecting in said annular space and inducing air flow inwardly through said air intake port means and outwardly through said air outlet port means upon rotation of said drive device.

2. In a snowmobile as defined in claim 1, wherein said first pulley flange includes a cylindrical skirt portion axially projecting toward and in circumscribing relationship with said drive device, and having outlet apertures therethrough inclined in the same circumferential direction around said first pulley flange and relative to a radius of the latter and constituting said air outlet port means.

3. In a snowmobile as defined in claim 2, wherein said centrifugally responsive members constitute flat weights pivoted to said drive device into planes extending radially of the latter, and said drive device includes a circular wall having inlet apertures therethrough, and said air intake means includes air duct means opening at one end at the exterior of said closed space and communicating at the other end with said annular space through said inlet apertures.

* * * * *